United States Patent [19]

Amann

[11] Patent Number: 5,223,329
[45] Date of Patent: Jun. 29, 1993

[54] LAMINATE SHEET ARTICLE

[76] Inventor: John A. Amann, 19 Alameda Pl., Mt. Vernon, N.Y. 10552

[21] Appl. No.: 647,258

[22] Filed: Jan. 29, 1991

[51] Int. Cl.$^5$ .......................... B32B 5/24; B32B 5/26; B32B 7/02; B32B 7/04; B32B 33/00

[52] U.S. Cl. .................. 428/198; 15/104.93; 15/DIG. 13; 428/282; 428/284; 428/285; 428/286; 428/287; 428/302; 428/303; 428/315.7; 428/315.9; 428/316.6; 428/332; 428/339; 428/349

[58] Field of Search ............. 428/286, 302, 198, 282, 428/284, 285, 287, 303, 315.7, 315.9, 316.6, 332, 339, 340; 15/104 R, 104.93, 210 R, DIG. 13

[56] References Cited

U.S. PATENT DOCUMENTS

| | | | |
|---|---|---|---|
| 874,010 | 12/1907 | Johnson | 400/702 |
| 3,477,083 | 11/1969 | Park | 15/104 R |
| 3,477,084 | 11/1969 | Thomas | 15/104.93 |
| 4,196,245 | 4/1980 | Kitson et al. | 428/302 |
| 4,357,615 | 11/1982 | Yoshiharu et al. | 15/210.1 |
| 4,408,241 | 10/1983 | Ogawa | 15/210.1 |
| 4,436,780 | 3/1984 | Hotchkiss et al. | 428/198 |
| 4,603,069 | 7/1986 | Haq et al. | 428/76 |
| 4,611,361 | 9/1986 | Shinkai | 15/104.93 |
| 4,628,388 | 12/1986 | Kawabe | 15/210.1 |
| 4,686,132 | 8/1987 | Sumii et al. | 15/104.93 |
| 4,761,326 | 8/1988 | Barnes et al. | 428/286 |
| 4,766,029 | 8/1988 | Brock et al. | 428/286 |
| 4,781,966 | 11/1988 | Taylor | 428/302 |
| 4,808,467 | 2/1989 | Suskind et al. | 428/286 |
| 4,810,571 | 3/1989 | Guthrie | 428/286 |
| 4,906,513 | 3/1990 | Kebbell et al. | 428/286 |
| 4,933,015 | 6/1990 | White | 15/210.1 |
| 5,053,157 | 10/1991 | Lloyd | 15/104.93 |
| 5,075,919 | 12/1991 | Rogers et al. | |

*Primary Examiner*—James C. Cannon

[57] ABSTRACT

A moderately flexible laminate sheet article 30, capable of simultaneously cleaning both inner surfaces of slots and cavities of credit card readers, fax machines and the like, and in particular the scanners, sensors and printers residing therein, having a three layer structure, comprising two outer layers 21 and 23, that provide outer surface cleaning means, and comprising natural or synthetic, woven or nonwoven fibers, spot bonded to a moderately flexible, resilient center layer 22, comprising natural or synthetic, woven or nonwoven fibers, film or foam, wherein said spotbonds comprise 2% to 99% of bondable area. The laminate sheet article 30 has sufficient stiffness and resilience to prevent its wrinkling, buckling, crumpling or kinking while in use, and has utility for cleaning surfaces in its dry, or when saturated with liquids, in its wet state.

24 Claims, 2 Drawing Sheets

LAMINATE SHEET ARTICLE

BACKGROUND

1. Field of the Invention

This invention relates to a process for continuously manufacturing an improved laminate sheet article, the resulting product, and improvements in the process for manufacturing the same, and particularly to laminate sheet articles comprising a three layer structure, having two outer layer cleaning means that are useful for simultaneously cleaning both interior surfaces of slots and cavities, and the sensing, scanning and printing devices residing therein, commonly found in slot card readers, fax machines, toll ticket machines, lottery machines and cavity type card readers.

2. Description of the Prior Art

Magnetic and optic scanners are commonly used in slot card readers, toll ticket machines, lottery machines, fax machines and the like. Their narrow openings, used for accessing these devices with credit cards or sheet like documents, make routine cleanings a difficult task.

In use they accumulate dirt, debris, organic films, and resinous matter that requires frequent removal to prevent malfunctions. For routine cleanings, stiff sheet like articles of paper or paperboard are commonly used. Some are treated with resinous materials to impart stiffness and reduce the shedding of cellulosic fibers. They are occasionally saturated with cleaning solutions to provide an improved cleaning capability.

A sheet like article, as revealed in Johnson (874 010) 1907, comprised of a course cotton cloth adhesively laminated to a moderately stiff paper support layer is limited to one sided cleaning applications. Additionally, the cotton cloth sheds fibrous debris and the laminating adhesive is a source of contamination.

Another sheet like article as revealed in Haq et al. (4 603 069) 1986, is impractical due to its substantial flexibility which would cause it to wrinkle and jam in the slots of the readers, thereby rendering it ineffective.

The aforesaid sheet like cleaning articles, while able to access the readers and scanners, often fail because of their tendency to shed fibrous debris during the cleaning process, thereby defeating their purpose. Furthermore, the sheet like board and paper articles, because of their substantially hard and smooth surfaces lack the ability to trap and remove debris.

Cotton tipped swabs are also used, but they are often too thick to fit into the slots, and they also have the problem of shedding and leaving fibrous residues.

OBJECTS AND ADVANTAGES

The improved laminate sheet article of this invention comprises a three layer structure, comprising two outer layer cleaning means having unique and novel cleaning capabilities that provide simultaneous cleaning of both inner surfaces of slots in slot card readers, toll machines, lottery machines, and the like, a property not found in the prior art. An optionally thinner version of the said improved laminate sheet article can be produced to provide excellent cleaning results when cleaning scanners and printers in the narrower cavity openings of fax machines.

The preferred manufacturing process for making the improved sheet laminate articles of this invention, utilizes sonic energy to simultaneously bond three or more layers of thermoplastic or thermosetting, woven or nonwoven fabrics, felts, foams or sheet materials of various weights, and thicknesses. Although their use is within the scope of this invention, the elimination of adhesives and binders in the bonding process is advantageous, because they are an added expense, can alter the physical properties of the laminate sheet article in an unpredictable fashion, and are troublesome in use.

Furthermore, the flexibility of the sonic bonding process allows options in the specifications of the components of fabric layers, as for example, the use of filamental, meltblown, crimped or uncrimped fibers, thereby giving wide latitude in specifying the particular components of outer layers that provide superior cleaning properties, while at the same time specifying the components of the center layer to provide the required flexibility and resilience to accommodate transport through the equipment of its intended application. Still further, the components that are chosen for the various layers will not shed lint or fibers during use. Nonwoven and woven fabrics are commercially available in various constructions, densities, weights and thicknesses. This allows, for example, the manufacture of a range of thicknesses of the laminate sheet article, to suit variations in the opening of the slots in the slot card readers.

A further unique advantage provided by the sonic bonding process is the choice of resiliency and compressibility of the various layers, which permits the use of a laminate sheet article thicker than the slot opening. Upon insertion into a slot, the laminate sheet article is caused to slightly compress, which causes a soft scrubbing action on the inside surfaces and their concomitant sensing or scanning heads, and results in an effective cleaning activity.

Additionally, the scrubbing action is further improved by impressing an embossed like surface pattern onto the outer cleaning surfaces of the laminate sheet article by using a raised patterned surface on the vibratory reaction roll that is part of the sonic laminating apparatus.

Still further, the laminate sheet articles accommodate saturation with water and solvent based cleaning solutions to improve their cleaning action. This is particularly advantageous where resinous deposits from inks and binders can only be removed from sensing heads and scanners by dissolving them, while being wiped with the laminated sheet article. Additionally, this permits presaturation of the laminate sheet articles with cleaning solutions, which are then packed in appropriately leakproof packing.

Thus the improved laminate sheet article of this invention has obvious and unique advantages over the prior art.

DESCRIPTION OF THE PREFERRED EMBODIMENTS

Figure 1:
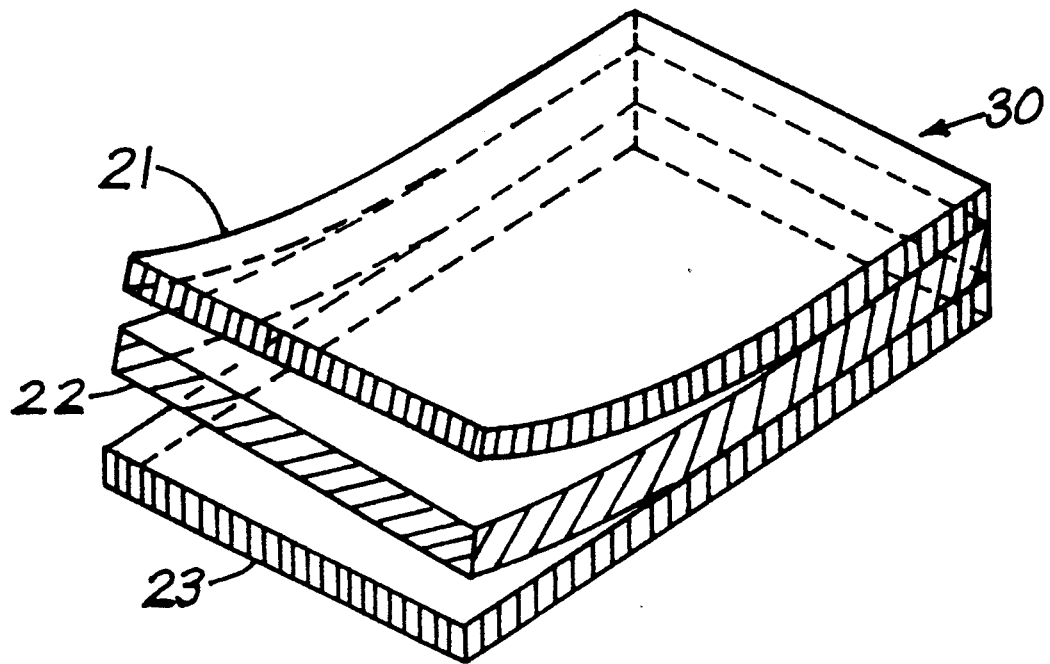

The preferred embodiment of the improved Laminate Sheet Article is shown in isometric view, and in exaggerated thickness for purpose of clarity, as three ply laminate 30 in FIG. 1. Laminate 30 is comprised of substantially flexible cleaning layer 21, bonded to one surface of moderately flexible center layer 22, and substantially flexible cleaning layer 23 bonded to the opposite surface of moderately flexible center layer 22. For purpose of clarity, the term "moderately flexible" as used herein, is intended to mean, that the so defined layers provide enough stiffness and resilience to the finished laminate sheet article to prevent its wrinkling, crumpling, kinking or buckling while in use. Layers 21, 22, and 23 are preferably bonded to each other, in one step by means of ultrasonic energy, to result in the laminate sheet article 30, as illustrated in the process shown in FIG. 4.

EXAMPLE-1

When manufacturing the laminate sheet article for slot cleaning applications, outer cleaning layers 21, and 23 are identical and are preferably comprised of a fabric of melt blown thermally bonded nonwoven Polypropylene fibers wherein fibers have a diameter of approx. 2 to 12 microns. The fabric preferably has a basis weight of 0.6 ounces per square yard and the corresponding thickness will be approx. 0.010 inches. These Polypropylene nonwoven fabrics are commercially available, and are commonly identified as disposable diaper liner fabric. Furthermore, the Polypropylene fibers used in fabric layers 21 and 23, are preferred for their softness, which prevents abrasion damage to the aforesaid delicate scanning and sensing devices, while at the same time having the cohesive strength to perform rigorous cleaning operations without shedding fibrous debris.

Layer 22 is preferably comprised of a moderately flexible nonwoven fabric layer comprised of continuous filament spunbonded polyester, polypropylene or nylon filaments that are randomly arranged, highly dispersed and thermally bonded at the filament junctions. The filaments are preferably in uncrimped form and are of 2 to 10 denier per filament. A spunbonded nonwoven Polyester fabric having a basis weight of 6.0 ounces per square yard and a thickness of 0.027 inches is the preferred fabric for use in support layer 22. The said fabric layer 22 has good resilience, compressibility and moderate flexibility.

The preferred nonwoven fabric of center layer 22, embodying the aforesaid requirements is commercially identified and available by the name of REEMAY ®, a trademarked product of the Reemay Corp. The preferred method of manufacturing the laminate sheet article 30 uses an apparatus schematically illustrated in FIG. 4.

Figure 4:
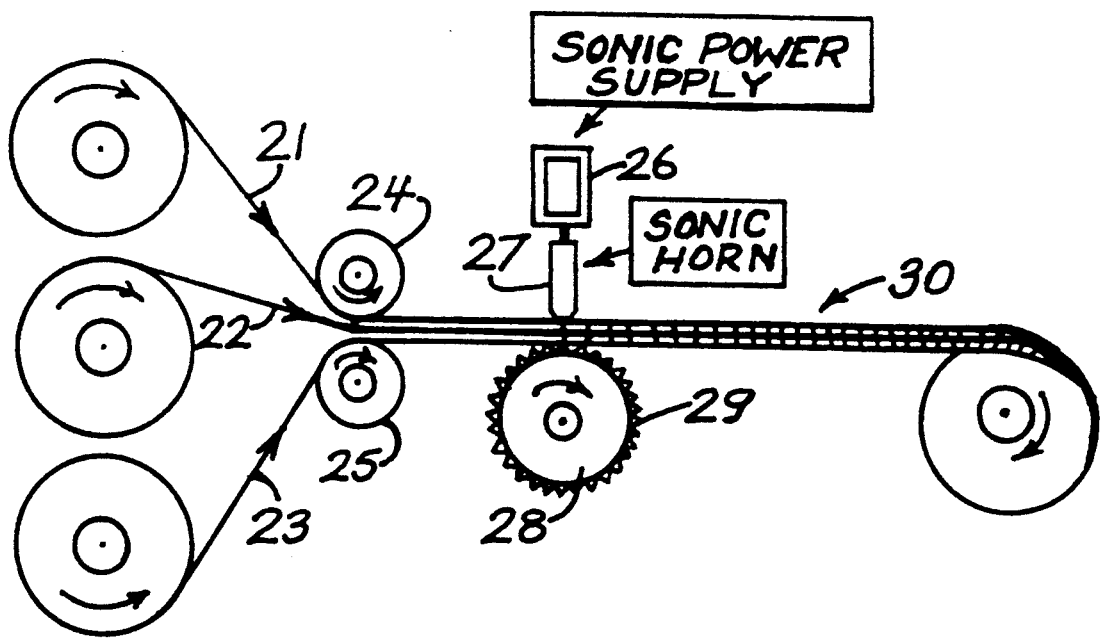

The nonwoven fabrics of layers 21, 22, and 23, supplied in rolls of equal widths, are mounted in stacked alignment with each other on the shafts of so called unwind stands that support the rolls, and permit them to be unrolled in a controlled manner by use of a brake mechanism (not shown), that applies tension to the unwinding fabric layers, thereby maintaining a stable path of as they pass through the apparatus shown in FIG. 4. In operation, the layers 21, 22, and 23 are unwound simultaneously, in an aligned, stacked arrangement, and are caused to converge in the nip of pull rolls 24 and 25, which, under pressured engagement, and powered by suitable means to rotate, continuously pull the three aligned and stacked layers of nonwoven fabrics at uniform speed from their unwinding parent rolls.

Upon exiting the nip of pull rolls 24 and 25, fabric layers 21, 2, and 23 are transported in unison into the nip formed by the vibratory mechanical energy emitting surface of bar horn 27 and the reaction surface 29 of reaction roll 28, which is also powered by suitable means to rotate, so that its surface speed is equal to the surface speed of pull rolls 24 and 25.

The sonic energy apparatus 26, converts electrical energy into mechanical vibratory energy, which is transmitted to its attached bar shaped vibratory mechanical energy emitting horn 27, that in turn directs the mechanical vibratory energy from its energy emitting surface into nonwoven fabric layers 21, 22, and 23.

The mechanical vibratory energy emitting surface of horn 27 is flat and of rectangular shape, wherein the length of the rectangle defines the so called length of the said bar horn 27.

In the laminating apparatus, the longitudinal centerline of the energy emitting surface of horn 27 is positioned, parallel with the axis of opposing reaction roll 28, to form an equidistant gap with the line of tangency across the reaction surface 29 of the said opposing reaction roll 28. The gap is adjusted to approx. one half the combined thickness of layers 21, 22, and 23, and is commonly referred to as the nip. The length of bar horn 27 and the width of reaction surface 29 on reaction roll 28 is preferably slightly greater than the width of the stacked layers 21, 22, and 23.

As they enter the nip formed by the energy emitting surface of bar horn 27 and the reaction surface 29 of reaction roll 28, layers 21, 22, and 23 are compressed, forcing them to absorb the mechanical vibratory energy emitted from the energy emitting surface of bar horn 27, causing their temperature to instantly rise to their fusion point, and resulting in the immediate bonding of the three layers. Upon exiting the nip, the fused areas cool and solidify to become the laminate sheet article 30. Thereafter it is wound into rolls for subsequent cutting or sheeting operations.

The use of a smooth reaction surface 29 on reaction roll 28, results in the bonding of 100% of the adjacent surface areas of layers 21, 22, and 23 to each other, and results in a laminate sheet article 30, with good cleaning capabilities.

Further experiments were conducted by evaluating the use of a so called embossing roll for reaction roll 28, which had a linen pattern engraved onto its outer reaction surface 29 to produce three dimensional effects when used on paper products and the like.

The experiments revealed that only the outermost peripheral surfaces of the embossed pattern on reaction surface 29 of reaction roll 28 produced sonic bonding of the fabric layers 21, 22, and 23. The result, rather unexpected, was a viable laminate sheet article 30, with bonded areas of approx. 10% of the total area, which had retained all the desirable properties of the component fabric layers, and additionally had embossed surfaces which further improved their cleaning capability.

Further experiments, using reaction rolls 28, with specially designed peripheral patterns engraved on reaction surface 29, such as raised dots, raised segmented line designs, and raised surface areas produced even better results, and established that engraved patterns resulting in bonded areas in the range of 1% to 99% of the laminate sheet article may be used.

Figure 2:
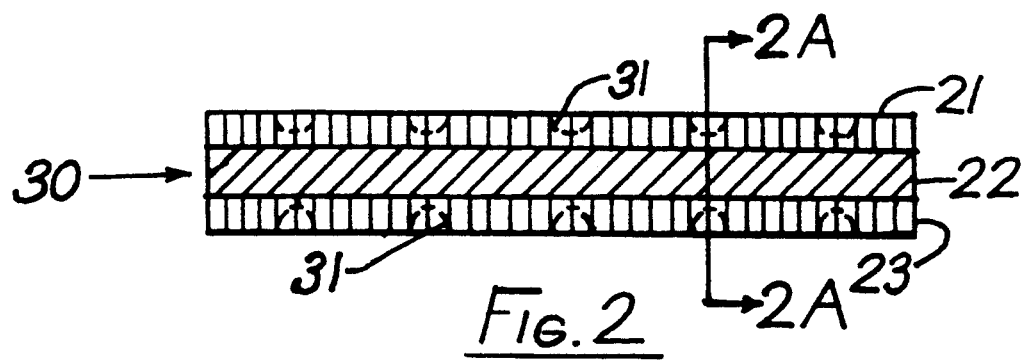
Figure 2A:
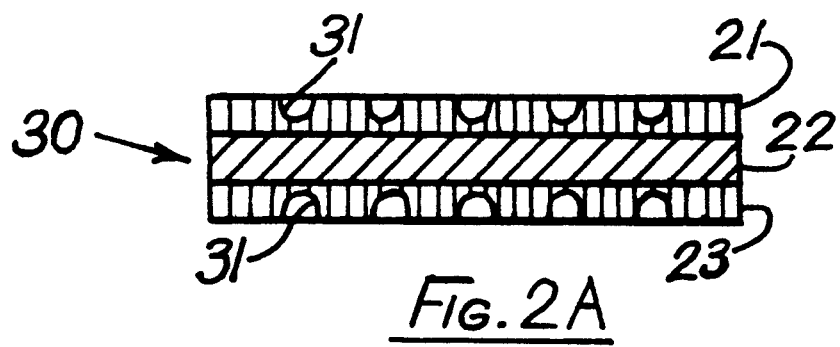
Figures 3, 3A:
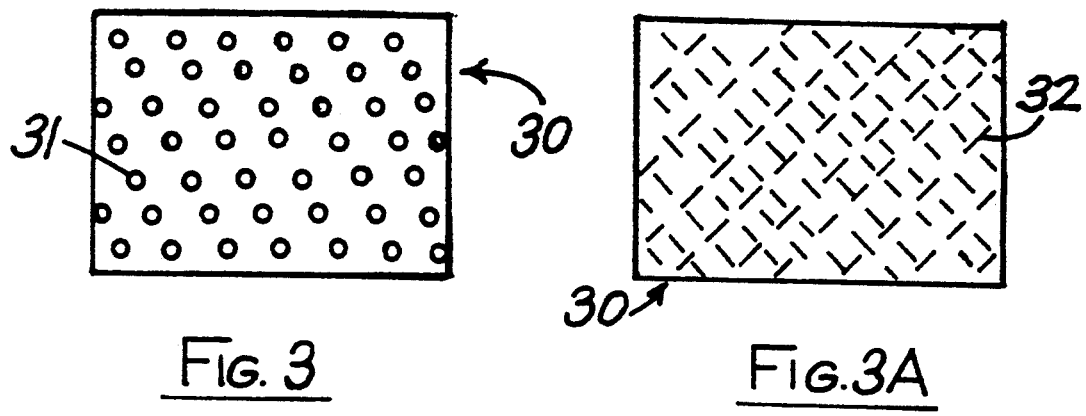

In particular, a so called pin dot pattern shown in reverse, appearing as 31 on the resulting surface of laminate 30 in FIG. 3, or a line segment pattern also shown in reverse as 32 in FIG. 3a, are examples of preferred patterns for reaction surface 29, that provide a bonding area of approx. 5% of the total surface area of laminate 30. A laminate 30 bonded by using a pin dot pattern 31 engraved on reaction surface 29 of reaction roll 28 is shown in crossection in FIG. 2a.

A low percentage of bonded area in the laminate 30 is preferred because the desirable cleaning properties of layers 21, 22, and 23 in their unbonded state are retained, and are additionally enhanced by the embossed surfaces produced by the patterned reaction surface 29 of reaction roll 28. Furthermore, their resilient and compressive properties are also retained. Still further, it allows optional surface pattern designs that comply with special requirements, such as for example, eye appeal.

The laminate 30, produced by the aforesaid sonic bonding process has the desired thickness of approx. 0.033 to 0.038 inches, that in use, exhibits the flexibility, absorptivity, compressibility and unique cleaning capabilities that provide superior results in the cleaning of slots in slot card readers, wherein credit cards of industry standard thickness of 0.030 inch are used.

EXAMPLE-2

When manufacturing the laminate sheet article 30, for use in cleaning the scanners and print heads of facsimile machines, a thinner three layer structure is required, wherein the melt blown thermally bonded polypropylene fabric layers 21, and 23, have a basis weight of 0.5 ounce per square yard, and the spunbonded polyester layer 22 has a basis weight of 2.10 ounces per square yard.

Layers 21, 22, and 23 are bonded to result in laminate sheet article 30 by using the same sonic bonding process revealed in Example-1, and as shown in FIG. 4, with some minor adjustments, such as decreasing the gap between pull rolls 24 and 25, and decreasing the gap between the energy emitting surface of bar horn 27, and the reaction surface 29 of reaction roll 28, to provide the required compression of nonwoven fabric layers 21, 22, and 23.

The resulting laminate sheet article 30 is approx. 0.020 inches thick, is moderately flexible, to prevent its wrinkling in the transport mechanism of fax machines, and produces the desired results in cleaning the aforesaid scanners and print heads.

When the laminate sheet article 30 is used in applications other than those cited in the aforesaid preferred Examples 1, and 2, as for example in toll machines, the outer layers 21, and 23, may optionally comprise other synthetic or natural, woven or nonwoven fibers, as for example: felt, high loft cellulosics, microporous sponge, acrylic wovens, or nonwoven hydroentangled mixtures of wood pulp fibers and polyester fibers known as Sontara, a trademarked product of the DuPont Co.

Moderately flexible center layer 22 may optionally comprise synthetic or natural, thermoplastic or thermosetting sheet materials such as: films, polyester or polyurethane foams, paper board, microsponge sheeting, fiberglass mat, and felt.

When adjacent layers cannot be bonded with sonics or heat as would be encountered when the adjacent layers comprise thermosetting components, an intermediate layer of a thin, thermoplastic film positioned between the thermosetting layers is used to provide the bonding media.

As illustrated in Example 1, when layers 21, 22, and 23, are sonic or heat bonded, a bonded area of 1% to 100% is the preferred range. When bonding less than 100% of their bondable area, spot bonds of 1% to 99% of their area are preferred. The best results however, are obtained with bonded areas in the 2% to 50% range.

Although heat bonding or adhesive bonding of layers 21, 22, and 23 to each other are viable methods of bonding and are inclusive of this invention, their use is less favored because of the superior results achievable with the sonic bonding process.

EXAMPLE -3

Is an optional construction of a three layered laminate sheet article 30, wherein the layers are assembled and bonded in a reverse fashion, and wherein the previously so called moderately flexible center layer is used for the outer layers 21, and 23, and the previously so called outer cleaning absorptive layer is used for the center layer 22.

The same sonic bonding process used in Examples 1, and 2, is used for bonding the three layers to form the laminate sheet article 30. For example, a slot card cleaning article can be made by bonding outer layers 21, and 23, comprised of a moderately flexible, crimped, spunbonded synthetic nonwoven fabric, having a basis weight of 1.00 ounce per square yard, to the center layer 22, comprised of a melt blown thermally bonded thermoplastic nonwoven fabric having a basis weight of 2.0 ounces per square yard.

The use of a lighter, crimped fiber, spunbonded synthetic fabric for the outer layers 21 and 23, imparts the moderate flexibility, provides the desired cleaning capabilities, and has the so called open fiber filamental structure to efficiently trap and capture fibrous and particulate debris, while the thicker absorptive center layer 22 absorbs the resinous and pigmented matter.

CONCLUSION

The reader will see that the Laminate Sheet Article of this invention provides a unique, suitably flexible, dual surface cleaning article that has superior capabilities of cleaning the inner surfaces and their concomitant magnetic readers in the slots of slot card readers, and scanners and printers in fax machines, lottery machines, highway toll machines, transportation ticket machines and the like.

Outer layer as well as center layer specifications, and properties are easily changed to comply with different end use requirements.

The preferred sonic bonding process contributes unique benefits by preserving the original properties and cleaning activity potential of each component fabric layer. Furthermore, the sonic bonding process, when required, can simultaneously bond a plurality of more than three fabric layers to each other and impress preferred patterns on the surfaces of the article to further improve cleaning efficiency.

It permits for example, the bonding of many variations of synthetic and natural, nonwoven and woven fabrics, as well as films, foams, felts, microsponge sheet material, fiberglass, mineral wool and paper, as well as the bonding of alternately different layers to each other, as for example, thermoplastic layers to thermosetting layers.

Still further, the sonic bonding apparatus has the flexibility of bonding partial coverages of cleaning layers 21, and 23, on support layer 22, as for example, one side of the support layer 22 can be covered with a cleaning layer 21 covering and bonded to 75% of its surface, while having a cleaning layer covering and bonded to only 25% of its opposing surface.

The laminate sheet article 30, may also be manufactured in a reverse fashion, wherein two thinner resilient layers are used to form the outer moderately flexible layers 21 and 23, and a thicker substantially flexible absorbent compressible layer is specified for the center layer 22. This is viable because the said support layers also provide efficient cleaning surfaces.

Another benefit is that all the layers in the laminate sheet article 30, may be optionally specified to have absorptive properties, that additionally allow saturation with aqueous as well as solvent based cleaning liquids.

While the above contains many specifities, these should not be construed as limitations, but rather as an exemplification of the preferred embodiments thereof.

Accordingly, the scope of the invention should be determined not only by the embodiments illustrated, but by the appended claims and their legal equivalents.

I claim:

1. An improved, moderately flexible, resilient laminate sheet article having dual surface cleaning means, comprising two outer layer cleaning means bonded to a moderately flexible, resilient center layer, said moderately flexible center layer providing enough stiffness and resilience to the laminate sheet article to prevent its wrinkling, buckling, kinking or crumpling while in use as a cleaning means for the slots and cavities of machines.

2. The laminate sheet article defined in claim 1, wherein each of the two outer layer cleaning means comprise fabrics selected from the group consisting of synthetic and natural, woven and nonwoven filaments and fibers, having basis weights of 0.50 to 10.0 ounces per square yard.

3. The laminate sheet article defined in claim 1, wherein each of the two outer layer cleaning means comprise sheeting selected from the group consisting of synthetic and natural felt, foam, microsponge, and cellulosics having thicknesses of 0.002 to 0.050 inches.

4. The laminate sheet article defined in claim 1, wherein the moderately flexible center layer comprises woven and nonwoven fabrics selected from the group consisting of synthetic and natural, crimped and uncrimped filaments and fibers, having basis weights of 0.5 to 15.0 ounces per square yard.

5. The laminate sheet article defined in claim 1, wherein the moderately flexible center layer comprises sheeting selected from the group consisting of synthetic and natural film, foam, felt, microsponge, fiberglass, and mineral wool, having thicknesses of 0.002 to 0.10 inches.

6. The laminate sheet article defined in claim 1, comprising two outer layers of thermoplastic melt blown thermally bonded nonwoven fabric, each having a basis weight of 0.5 to 3.0 ounces per square yard, wherein both outer layers are bonded to a moderately flexible center layer comprising nonwoven spunbonded thermoplastic fabric having crimped or uncrimped filaments of 2 to 10 denier per filament, and having basis weights of 0.5 to 10.0 ounces per square yard.

7. The laminate sheet article defined in claim 1, comprising two outer layers of thermoplastic, melt blown, thermally bonded nonwoven fabric, having basis weights of 0.5 to 3.0 ounces per square yard, wherein both layers are bonded to a center layer comprising sheet material selected from the group consisting of thermoplastic and thermosetting films having thicknesses of 0.002 to 0.050 inches.

8. The laminate sheet article defined in claim 1, comprising two outer layers of nonwoven fabric comprised of a mixture of hydroentangled wood pulp and synthetic fibers, each having a basis weight of 0.5 to 3.0 ounces per square yard, wherein both outer layers are bonded to a moderately flexible center layer comprising sheet material selected from the group consisting of foam, felt, fiberglass, mineral wool, and microsponge having thicknesses of 0.002 to 0.050 inches.

9. The laminate sheet article defined in claim 1, wherein all layers are bonded to each other over 100% of their adjacent surface areas, using heat, ultrasonics, or adhesives.

10. The laminate sheet article defined in claim 1, wherein all layers are bonded to each other with spot bonds covering 1% to 99% of their adjacent surface area.

11. The spot bonds defined in claim 10, wherein the spot bonds are sonic bonds, heat bonds, or adhesive bonds.

12. The spot bonds defined in claim 10, wherein the bonds have a pattern arrangement comprising dots, line segments, or areas.

13. The laminate sheet article defined in claim 1, comprising a plurality of center layers.

14. The laminate sheet article defined in claim 1, wet or saturated with liquids selected from the group consisting of aqueous and organic solvents and solutions.

15. An absorptive, compressive, moderately flexible laminate sheet article, comprising two moderately flexible outer layer cleaning means, bonded to an absorptive, compressive, flexible center layer, said moderately flexible outer layers providing enough stiffness and resilience to the laminate to prevent its wrinkling, buckling, kinking or crumpling while in use as a cleaning means for the slots and cavities of machines.

16. The laminate sheet article defined in claim 15, wherein the two moderately flexible outer layer cleaning means comprise fabrics selected from the group consisting of woven and nonwoven, synthetic and natural, crimped and uncrimped filaments and fibers having basis weights of 0.50 to 10.0 ounces per square yard, and wherein the center layer comprises fabrics selected from the group consisting of synthetic and natural, woven and nonwoven filaments and fibers having basis weights of 0.50 to 10.0 ounces per square yard.

17. The laminate sheet article defined in claim 15, comprising two outer layers of spunbonded nonwoven fabric, comprising crimped or uncrimped filaments of 2 to 10 denier per filament, each having a basis weight of 0.5 to 6.0 ounces per square yard, wherein both outer layers are bonded to a center layer comprising thermoplastic melt blown thermally bonded nonwoven fabric having basis weights of 0.5 to 10.0 ounces per square yard.

18. The laminate sheet article defined in claim 15, comprising two outer layers of spunbonded nonwoven fabric having uncrimped filaments of 2 to 10 denier per filament, and each having a basis weight of 1.0 to 10.0 ounces per square yard, wherein both outer layers are bonded to a center layer comprising sheet materials selected from the group consisting of synthetic and natural foam, felt, and microsponge, having thicknesses of 0.002 to 0.10 inches.

19. The laminate sheet article defined in claim 15, all layers are bonded to each other over 100% of their adjacent surface areas, using heat, ultrasonics, or adhesives.

20. The laminate sheet article defined in claim 15, wherein all layers are bonded to each other with spot bonds covering 1% to 99% of their adjacent surface area.

21. The spot bonds defined in claim 20, wherein the spot bonds are sonic bonds, heat bonds, or adhesive bonds.

22. The spot bonds defined in claim 20, wherein the bonds have a pattern arrangement comprising dots, line segments, or areas.

23. The laminate sheet article defined in claim 15, comprising a plurality of center layers.

24. The laminate sheet article defined in claim 15, wet or saturated with liquids selected from the group consisting of aqueous and organic solvents and solutions.

* * * * *